(12) United States Patent
Apparao et al.

(10) Patent No.: US 7,937,412 B2
(45) Date of Patent: May 3, 2011

(54) PROCESS AND SYSTEM FOR INCORPORATING AUDIT TRAIL INFORMATION OF A MEDIA ASSET INTO THE ASSET ITSELF

(75) Inventors: Vidur Apparao, Palo Alto, CA (US); John Bandhauer, Aptos, CA (US); Christopher Waterson, San Francisco, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 12/782,258

(22) Filed: May 18, 2010

(65) Prior Publication Data

US 2010/0228719 A1 Sep. 9, 2010

Related U.S. Application Data

(63) Continuation of application No. 11/733,687, filed on Apr. 10, 2007, now Pat. No. 7,747,603, which is a continuation of application No. 10/640,680, filed on Aug. 12, 2003, now Pat. No. 7,213,036.

(51) Int. Cl.
G06F 7/00 (2006.01)
G06F 17/30 (2006.01)

(52) U.S. Cl. ........................... 707/802; 707/709
(58) Field of Classification Search .................. 707/802, 707/709
See application file for complete search history.

(56) References Cited

U.S. PATENT DOCUMENTS

| | | | |
|---|---|---|---|
| 5,506,847 A * | 4/1996 | Shobatake | 370/338 |
| 5,577,028 A * | 11/1996 | Chugo et al. | 370/409 |
| 5,920,700 A | 7/1999 | Gordon et al. | |
| 5,940,390 A * | 8/1999 | Berl et al. | 370/389 |
| 6,003,039 A | 12/1999 | Barry et al. | |
| 6,092,080 A | 7/2000 | Gustman | |
| 6,223,343 B1 | 4/2001 | Hopwood et al. | |
| 6,226,618 B1 | 5/2001 | Downs et al. | |
| 6,236,994 B1 | 5/2001 | Swartz et al. | |
| 6,252,946 B1 | 6/2001 | Glowny et al. | |
| 6,252,947 B1 | 6/2001 | Diamond et al. | |
| 6,263,313 B1 | 7/2001 | Milsted et al. | |
| 6,345,256 B1 | 2/2002 | Milsted et al. | |
| 6,345,288 B1 | 2/2002 | Reed et al. | |
| 6,353,831 B1 | 3/2002 | Gustman | |
| 6,360,234 B2 | 3/2002 | Jain et al. | |

(Continued)

FOREIGN PATENT DOCUMENTS

EP 1126392 8/2001

(Continued)

OTHER PUBLICATIONS

Brussee: Content Distribution Networks, State of the art, Telematica Instituut, CDN 2, Version 1.0, Jun. 1, 2001.*

(Continued)

*Primary Examiner* — Kuen S Lu
(74) *Attorney, Agent, or Firm* — Michael A. Glenn; Glenn Patent Group

(57) ABSTRACT

An enhanced metadata structure and associated process is provided which captures and stores metadata gathered about the source and usage of a media asset or file. The source and usage metadata is integrated, such as by encoding within the enhanced media file, as the media asset is transferred and used. The integrated metadata accumulates, as a trail of source information and usage information in the enhanced media asset, and can be extracted upon arrival at a target computer system.

25 Claims, 8 Drawing Sheets

U.S. PATENT DOCUMENTS

| | | | |
|---|---|---|---|
| 6,366,917 B1 | 4/2002 | St. Herbert, III | |
| 6,374,260 B1 | 4/2002 | Hoffert et al. | |
| 6,381,640 B1 | 4/2002 | Beck et al. | |
| 6,385,174 B1* | 5/2002 | Li | 370/252 |
| 6,389,538 B1 | 5/2002 | Gruse et al. | |
| 6,426,778 B1 | 7/2002 | Valdez, Jr. | |
| 6,442,748 B1 | 8/2002 | Bowman-Amuah | |
| 6,448,485 B1 | 9/2002 | Barile | |
| 6,466,941 B1 | 10/2002 | Rowe et al. | |
| 6,477,580 B1 | 11/2002 | Bowman-Amuah | |
| 6,505,160 B1 | 1/2003 | Levy et al. | |
| 6,519,568 B1 | 2/2003 | Harvey et al. | |
| 6,523,046 B2 | 2/2003 | Liu et al. | |
| 6,529,909 B1 | 3/2003 | Bowman-Amuah | |
| 6,529,948 B1 | 3/2003 | Bowman-Amuah | |
| 6,539,396 B1 | 3/2003 | Bowman-Amuah | |
| 6,574,655 B1* | 6/2003 | Libert et al. | 709/200 |
| 6,868,072 B1* | 3/2005 | Lin et al. | 370/276 |
| 2002/0053085 A1* | 5/2002 | Toguri | 725/51 |
| 2002/0067858 A1* | 6/2002 | Lazaridis | 382/228 |
| 2002/0157116 A1* | 10/2002 | Jasinschi | 725/136 |
| 2002/0165720 A1 | 11/2002 | Johnson et al. | |
| 2002/0184195 A1* | 12/2002 | Qian | 707/3 |
| 2003/0112467 A1* | 6/2003 | McCollum et al. | 358/1.18 |
| 2004/0039754 A1* | 2/2004 | Harple, Jr. | 707/104.1 |
| 2006/0143462 A1* | 6/2006 | Jacobs | 713/181 |

FOREIGN PATENT DOCUMENTS

| | | |
|---|---|---|
| EP | 968476 | 1/2002 |
| EP | 1209589 | 5/2002 |
| EP | 1217823 | 6/2002 |
| EP | 1278364 | 1/2003 |
| EP | 1284461 | 2/2003 |
| EP | 1288827 | 3/2003 |

OTHER PUBLICATIONS

Foster, et al.; *The Virtual Data Grid, A New Model and Architecture for Data-Intensive Collaboration*; Jan. 5-8, 2003; Dept. of Computer Science, Univ. of Chicago; Proceedings of the 2003 CIDR Conference.

Cui, et al.; *Tracing the Lineage of View Data in a Warehousing Environment*; Jun. 2000; Computer Science Dept. Stanford University.

Cui, et al.; *Storing Auxiliary Data for Efficient Maintenance and Lineage Tracing of Complex Views*; Jun. 2000; Computer Science Dept. Stanford University.

Wang, et al.; *Preserving and Querying Histories of XML-Published Relational Databases*; Oct. 2002; Dept. of Computer Science, UCLA.

Watanabe, et al.; *An Image Data File Format for Digital Still Camera*; May 7-11, 1995; Final Program and Advance Printing of Papers, IS&T's 48th Annual Conference, Imaging on the Information Superhighway.

*Welcome to the Content Reference Forum*; retrieved on May 28, 2009 from website: http://www.crforum.org.

*Candidate Specification Public Review*; retrieved on May 29, 2008 from website: http://www.crforum.org.

Content Reference Forum; *Introduction*; May 17, 2003, 11 pages.

Content Reference Forum; *Core Specification 1.0 (CR10 001 Data Formats)*; Dec. 1, 2003.

Brussee; *Content Distribution Networks, State of the art*; Jun. 1, 2001; Telematica Instituut, CSN 2 Version 1.0, pp. 1-74.

Brussee; *Content Distribution Networks, State of the art*; Jun. 1, 2001; Telematica Instituut, CSN 2 Version 1.0, pp. 75-88.

\* cited by examiner

PROCESS AND SYSTEM FOR INCORPORATING AUDIT TRAIL INFORMATION OF A MEDIA ASSET INTO THE ASSET ITSELF

CROSS REFERENCE TO RELATED APPLICATION

This application is a Continuation of U.S. Ser. No. 11/733,687, entitled System for Incorporating Information About a Source and Usage of a Media Asset into the Asset Itself, filed 10 Apr. 2007, which is a Continuation of U.S. Ser. No. 10/640,680, entitled System for Incorporating Information About a Source and Usage of a Media Asset into the Asset Itself, filed 12 Aug. 2003, issued as U.S. Pat. No. 7,213,036 on 1 May 2007, which are each incorporated herein in their entirety by this reference thereto.

FIELD OF THE INVENTION

The invention relates to the integration of metadata within a media asset. More particularly, the invention relates to the integration of source and usage information within a distributed media asset.

BACKGROUND OF THE INVENTION

Media asset files are often sent from a source to one or more recipients, typically without further modification. The received files are typically stored within a recipient computer, such as within a directory and/or folder. The only metadata associated with a stored file that is typically retained and possibly recalled is that of a filename and file creation or modification date. In some operating environments, applications allow annotations to be added to the files themselves.

Through the passage of time, however, information regarding the source or subsequent use of a file is typically lost or forgotten. A recipient of a file therefore commonly has little or no idea of the origin or previous use or distribution of a stored file.

Furthermore, while some asset management systems externally index metadata about collections of files and how the files are used, as the files are transferred between computers, e.g. such as through an email transmission, any associated metadata that was previously captured is not included, such that the metadata is lost.

Information that is generally overlooked is the source of a media asset or file. For example, the original source, e.g. such as a particular camera and/or the identity of the creator, i.e. photographer, for a particular media asset, e.g. a photograph, is often not captured or stored for future use. Even if such source information is noted, it is typically not distributed when the media is sent to one or more recipients.

Other information that is often overlooked comprises the distribution channels and distribution times of a media asset or file. For example, while a file may be transferred between a plurality of users, the recipients and dates of transmission are not typically noted.

While such source and usage information is frequently lost in connection to a media asset or file, such source and usage information is often of great value to a user or recipient of a file. For example, a recipient of a family photograph may or may not be able to recall the source or usage information of the photograph. The recipient of the photograph may easily never know or lose track of the identity of the source device, e.g. the camera, used to create the photograph. The recipient of the photograph similarly lose track of the distribution of the photograph, i.e. how the recipient came into possession of the photograph.

Such source and usage information is often the most useful metadata for the user in helping them find a media file, based on what the user remembers about a file, e.g. the picture the recipient received from their mother last April, which the mother received from an uncle the month before, that the uncle took with his digital camera the month before. Unless a trail of source and usage is sent along with the media itself, then the full story of the media's history is lost.

Some current image metadata formats, e.g. Exif headers in JPEG and TIFF images, currently allow the storage of a metadata associated with an image, regarding the original creation of a photograph, such as device make, device model, and/or a photographer name. While such image metadata may provide basic information regarding the origin, i.e. creation, of an image, such header information does not include ongoing, i.e. dynamic, usage information of the image by the original source, nor does such information provide an audit trail for subsequent recipients, further usage, and/or transfer information.

Several structures and methods have been described for the use of metadata in a network environment.

T. Johnson and Z. Qian, Methods and System for Encoding and Decoding a Media Sequence, U.S. Patent Application Publication No. 2002/0165720 A1, describe "A is method of encoding a media sequence with at least one applet object provided. The applet object is inserted into at least one FMO file. A media sequence is provided with a media file. The FMO file is integrated into the media file and a synchronous bit is inserted. A further method encompasses decoding a media sequence."

K. Milsted, K. Nguyen, and Q. Gong, Method and Apparatus to Create Encoded Digital Content, U.S. Pat. No. 6,263,313 B1, describe "A method of automatically selecting processing parameters for encoding digital content. Metadata containing the genre of the digital content, receiving the compression level selected for encoding the digital content is received. An algorithm selected for encoding the digital content is received. And a previously defined table to select the processing parameters for encoding the digital content based on the genre of the content, the compression level selected and the algorithm selected is indexed and the processing parameters are retrieved. In accordance with another aspect of the invention, an apparatus is described to carry out the above method."

D. Reed, P. Heymann, S. Mushero, K. Jones, J. Oberlander, and D. Banay, Computer-Based Communication System and Method Using Metadata Defining a Control-Structure, U.S. Pat. No. 6,345,288 B1, describe "An automated communications system operates to transfer data, metadata and methods from a provider computer to a consumer computer through a communications network. The transferred information controls the communications relationship, including responses by the consumer computer, updating of information, and processes for future communications. Information which changes in the provider computer is automatically updated in the consumer computer through the communications system in order to maintain continuity of the relationship. Transfer of metadata and methods permits intelligent processing of information by the consumer computer and combined control by the provider and consumer of the types and content of information subsequently transferred. Object oriented processing is used for storage and transfer of information. The use of metadata and methods further allows for automating may of the actions underlying the communications, including communication acknowledgements and archiving of information. Service objects and partner servers provide specialized data, metadata, and methods to providers and consumers to automate many common communications services and transactions useful to both providers and consumers. A combination of the provider and consumer programs and databases allows for additional functionality, including coordination of multiple users for a single database."

L. Valdez Jr., System and Method for Providing Interactive Components in Motion U.S. Pat. No. 6,426,778 B1, describes "An editing system and delivery system synchronizes the transmission of interactive elements with a video signal, such that the interactive components may supplement information provided in the video signal at predefined periods. The interactive elements are transmitted in relation to the video such that the interactive elements will arrive in time to display the components concurrently with a portion of the video presentation. The interactive elements may be transmitted within a video signal to a viewer. The viewer is configured to display the interactive elements in response to a signal from the delivery system. An editing system is disclosed that may define a programming track for interactive elements that may be associated with one or more audio and video tracks. The editing system schedules transmission and appearance of the elements. A graphical user interface of the editing system may display a time in a presentation timeline when the interactive elements appear and the duration which the interactive elements are displayed. Graphical user interface representations of the interactive elements are translated into commands including file transfer instructions to be executed on a playback system. The playback system may transmit information element data within a video signal to a viewer."

S. Barile, Method and System for Embedding Audio Titles, U.S. Pat. No. 6,448,485, describes "A system and method for embedding audio titles is presented. Information encoded in a format is received about an audio program. The information is transformed into an audio signal conveying an audio description about the audio program. The audio description and the audio program are then embedded in a predetermined format."

M. Mowman-Amuah, Self-Described Stream in a Communication Services Patterns Environment, U.S. Pat. No. 6,477,580 B1, describes "A system, method, and article of manufacture are described for providing a self-describing stream-based communication system. Messages are sent which include data between a sending system and a receiving system. Meta-data is attached to the messages being sent between the sending system and the receiving system. The data of the messages sent from the sending system to the receiving system is translated based on the meta-data. The meta-data includes first and second sections. The first section identifies a type of object associated with the data and a number of attribute descriptors in the data. The second section includes a series of the attribute descriptors defining elements of the data."

Other structures and methods have also been described for the metadata and electronic content, such as Customization of Electronic Content Based On Consumer Attributes, European Patent No. 1 126 392 A2, A3; Method for Adding Personalized Metadata to a Collection of Digital Images, European Patent No. 1 209 589 A2; and I. Foster et al., The Virtual Data Grid: A New Model and Architecture for Data-Intensive Collaboration, Department of Computer Science, University of Chicago.

Other structures and methods have also been described for the creation, storage, and distribution of content, such as Method for Image Retrieval, European Patent No. 1 217 823 A2, A3; Method and System for Managing Images Over a Communication Network, European Patent No. 1 278 364 A2; Meta-Document Management System with User Definable Personalities, European Patent No. 1 284 461 A1; System, Method and Software Product for Allowing a Customer to Order Image Products Over a Communication Network From a Plurality of Different Providers, European Patent No. 1 288 827 A1; Re-Usable Database System, European Patent No. 0 968 476 B1; Y. Gordon and J. Ludington, System for Managing the Addition/Deletion of Media Assets Within a Network Based on Usage and Media Asset Metadata, U.S. Pat. No. 5,920,700; T. Barry and F. Lane, Data Repository with User Accessible and Modifiable Reuse Criteria, U.S. Pat. No. 6,003,039; S. Gustman, Digital Library System, U.S. Pat. No. 6,092,080; R. Hopwood, B. Sipes, T. Wayne, J. Quarton, and S. Milus, Computer System and Method to Track and Control Element Changes Throughout Application Development, U.S. Pat. No. 6,223,343 B1; E. Downs, G. Gruse, M. Hurtado, C. Lehman, K. Milsted, and J. Lotspiech, Electronic Content Delivery System, U.S. Pat. No. 6,226,618 B1; R. Swartz, J. Winkler, E. Janos, I. Markidon, and Q. Dou, Method and Apparatus for the Integration of Information and Knowledge, U.S. Pat. No. 6,236,994; D. Glowny, P. Ni, and J. Richter, System and Method for Integrating Call Record Information, U.S. Pat. No. 6,252,946 B1; D. Diamond, D. Glowny, T. Nguyen, P. Ni, and J. Richter, System and Method for Data Recording and Playback, U.S. Pat. No. 6,252,947 B1; K. Milsted, C. Kindell, and Q. Gong, Automated Method and Apparatus to Package Digital Content for Electronic Distribution Using the Identity of the Source Content, U.S. Pat. No. 6,345,256 B1; S. Gustman, Digital Library System, U.S. Pat. No. 6,353,831 B1; R. Jain, C. Fuller, M. Gorkani, B. Horowitz, R. Humphrey, M. Portuesi, and C. Shu, Video Cataloger System with Synchronized Encoders, U.S. Pat. No. 6,360,234 B2; H. St. John, Method of Modifying a Populated Database Structure by Modifying Metadata Describing the Database Structure, U.S. Pat. No. 6,366,917 B1; E. Hoffert, K. Cremin, A. Ali, S. Smoot, and B. Strull, Method and Apparatus for Uploading, Indexing, Analyzing, and Searching Media Content, U.S. Pat. No. 6,374,260 B1; C. Beck, J. Berke, J. Johnstone, R. Mitchell, J. Powers, M. Sidell, and C. Knuff, Method and Apparatus for. Automated Personalization and Presentation of Workload Assignments to Agents within a Multimedia Communication Center, U.S. Pat. No. 6,381,640 B1; System for Tracking End-User Electronic Content Usage, U.S. Pat. No. 6,389,538 B1; System, Method and Article of Manufacture for a Persistent State and Persistent Object Separation in and Information Services Patterns Environment, U.S. Pat. No. 6,442,748 B1; Content Management Tool and Service Table Database with Unique Service Entries Each Associated with a Set of Record Tables with Record Entries Including Links to Shared Record Entries in Other Tables, U.S. Pat. No. 6,466,941 B1; K. Levy and G. Rhoads, Connected Audio and Other Media Objects, U.S. Pat. No. 6,505,160 B1; D. Harvey, Y. Pandya, J. Anigbogu, J. Provost, J. Alvarado, D. Scheibner, S. Kanvinde, B. Fogelsong, and K. Kaan, System and Method for Electronic Data Delivery, U.S. Pat. No. 6,519,568 B1; M. Liu, M. Stokes, and G. Wong, Infrastructure and Method for Supporting Generic Multimedia Metadata, U.S. Pat. No. 6,523,046 B2; M. Bowman-Amuah, Method for Translating an Object Attribute Converter in an Information Services Patterns Environment, U.S. Pat. No. 6,529,909 B1; M. Bowman-Amuah, Multi-Object Fetch Component, U.S. Pat. No. 6,529,948 B1; M. Bowman-Amuah, Multi-Object Identifier System and Method for Information Service Pattern Environment, U.S. Pat. No. 6,539,396 B1; Y. Cui et al, Tracing the Lineage of View Data in a Warehousing Environment, Computer Science Department, Stanford University; Y. Cui et al, Storing Auxiliary Data for Efficient Maintenance and Lineage Tracing of complex Views, Computer Science Department, Stanford University; F. Wang et al., Preserving and Querying Histories of XML-Published Relational Databases, Department of Computer Science, University of California, Los Angeles; and M. Watanabe et al, An Image Data File Format for Digital Still Camera, Final Program and Advance Printing of Papers, IS&T's 48$^{th}$ Annual Conference, Imaging on the Superhighway.

While simple information, such as a file name and/or creation date may be captured and transferred with a file or media asset, a recipient of a media asset does not currently have a comprehensive trail of source information and/or usage of a media asset. It would be advantageous to provide a system and an associated method which incorporates information about the source and usage of a media asset within the media asset itself. The development of such a system would constitute a major technological advance.

As well, while some software applications include user definable metadata, such as to a creation date and/or a last modification date, there is currently no structure and associated process to capture and store source information and/or usage information within the asset, to provide an automated audit trail which can be selectively extracted at any point of distribution. The development of such a system and associated process would constitute a further major technological advance.

SUMMARY OF THE INVENTION

An enhanced metadata structure and associated process is provided which captures and stores metadata gathered about the source and usage of a media asset or file. The source and usage metadata is integrated, such as by encoding within the enhanced media file, as the media asset is transferred and used. The integrated metadata accumulates, as a trail of source information and usage information in the enhanced media asset, and can be extracted upon arrival at a target computer system. Some embodiments of the enhanced metadata structure and associated process also comprise the accumulation of transfer information metadata.

DETAILED DESCRIPTION OF PREFERRED EMBODIMENTS

Figure 1:
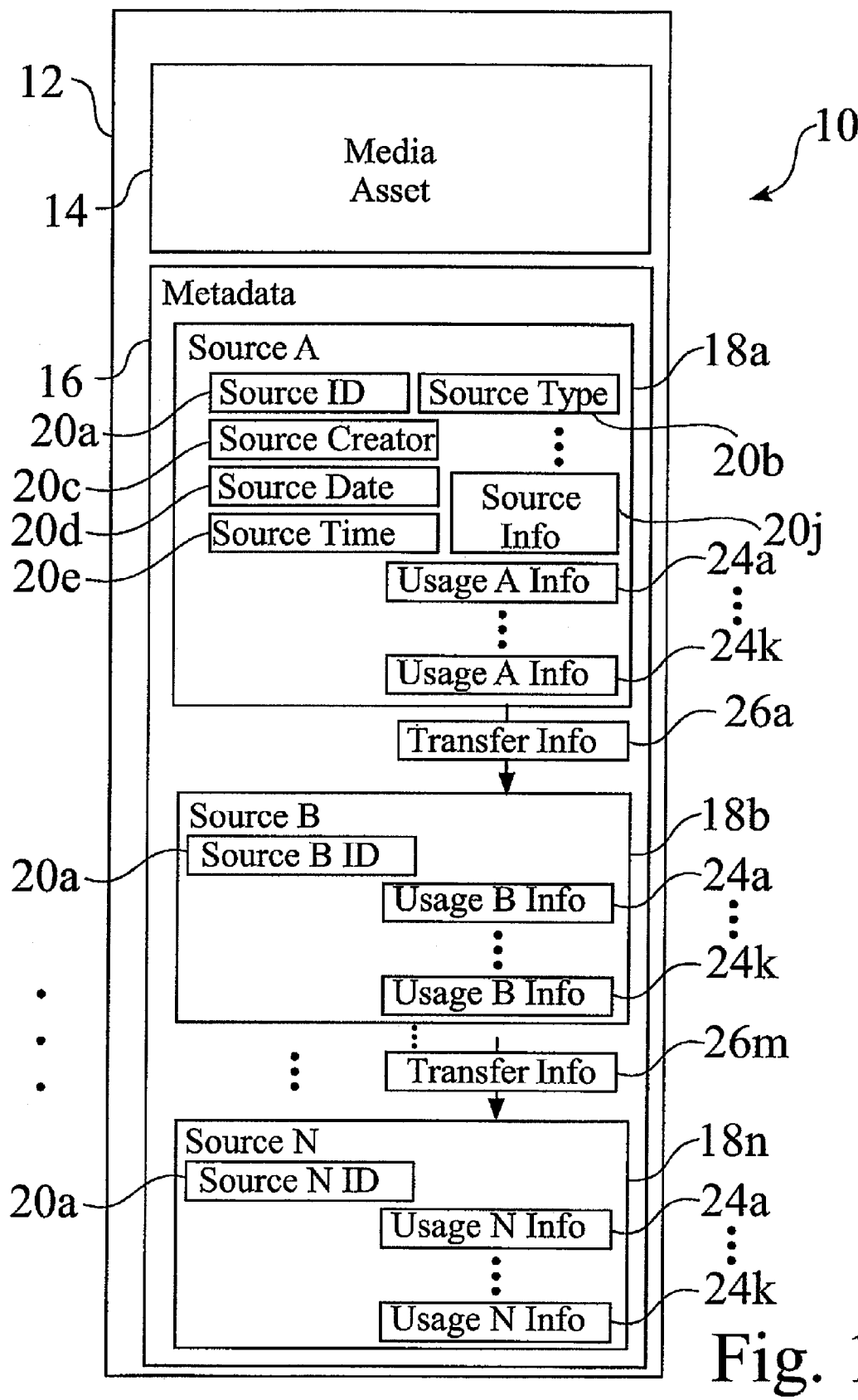
FIG. 1 is a schematic view of a content file having an integrated audit trail metadata.
Figure 5:
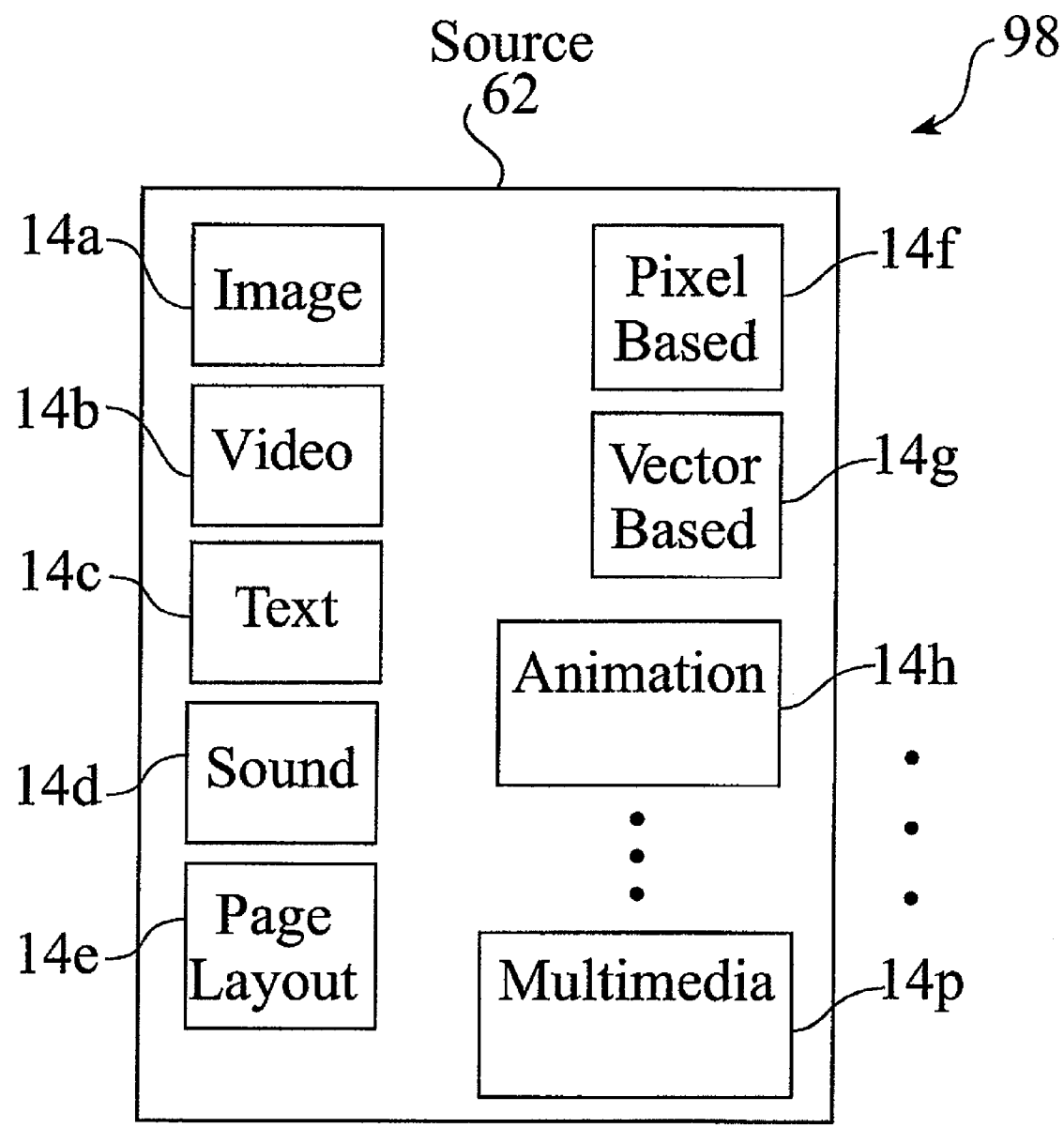
FIG. 5 shows alternate source content.

FIG. 1 is a schematic view 10 of an enhanced content file 12 having integrated audit trail metadata 16. The enhanced content file 12 comprises a media asset 14, as seen in FIG. 5, such as but not limited to image content 14a, video content 14b, text content 14c, sound content 14d, page layout content 14e, pixel-based content 14f, vector-based content 14g, animation content 14h, data content, and/or multimedia content 14p.

In addition to the source media asset 14, the enhanced media asset file 12 further comprises metadata 16, which comprises source, i.e. node, information 18a-18n, which may further comprise usage information 24a-24k at any of the source nodes 18a-18n. As well, the metadata shown in FIG. 1 further comprises transfer information 26a-26m, such as the date and/or time of transfer 50 (FIG. 2) of the enhanced content file 12 between nodes 18. For example, transfer information 26a shown in FIG. 1 typically comprises the transfer date from the original source node 18a to a second source node 18b.

As seen in FIG. 1, the metadata 16 comprises a comprehensive audit trail of the source media asset 14, which adds great value to an enhanced content file 12 as the file is transferred from a sender, i.e. source, node 18 to a recipient node 18, as the media asset is used 24a-24k at any of the nodes 18a-18n, and as subsequent recipient nodes 18a-18n act as source nodes 18 upon transfer to other recipient nodes 18.

The first source information 18a shown in FIG. 1 comprises a variety of information regarding the original source 18a and creation of the file content 14, such as source identification (ID) 20a, source type 20b, source creator 20c, source date 20d, source time 20e, and/or other source information 22j. As well, the first source information 18a shown in FIG. 1 preferably comprises usage information 24a-24k of the file content 14 by the first, i.e. original source 18a.

In some system embodiments 10, 110 (FIG. 7), 120 (FIG. 8), the type of source identification information 20a that is associated with each source entity 18 depends on the type of the source 18. For example, for a person 92, e.g. 92a in FIG. 4, the identification information 20a typically comprises a name, an e-mail address, and/or a screenname. Similarly, for a node 18 comprising a device 62 (FIG. 3) or terminal 70 (FIG. 3, FIG. 4), the identification, information 20a typically comprises manufacturer information, model information, and or a globally unique identifier for the physical device 62,70. Furthermore, for a node 18 which comprises a web site, the identification information 20a typically comprises a source URL, a containing URL, and/or an author.

While the first source 18a comprises the original, i.e. creator, of content 14, subsequent sources 18, e.g. 18b-18n comprise ongoing nodes, where each node 18 further comprises a source entity, such as a device 62,70 (FIG. 3, FIG. 4), a person 92, e.g. 92a,92b (FIG. 4), and/or a website, through which the content 14 is distributed and possibly used.

Figure 4:
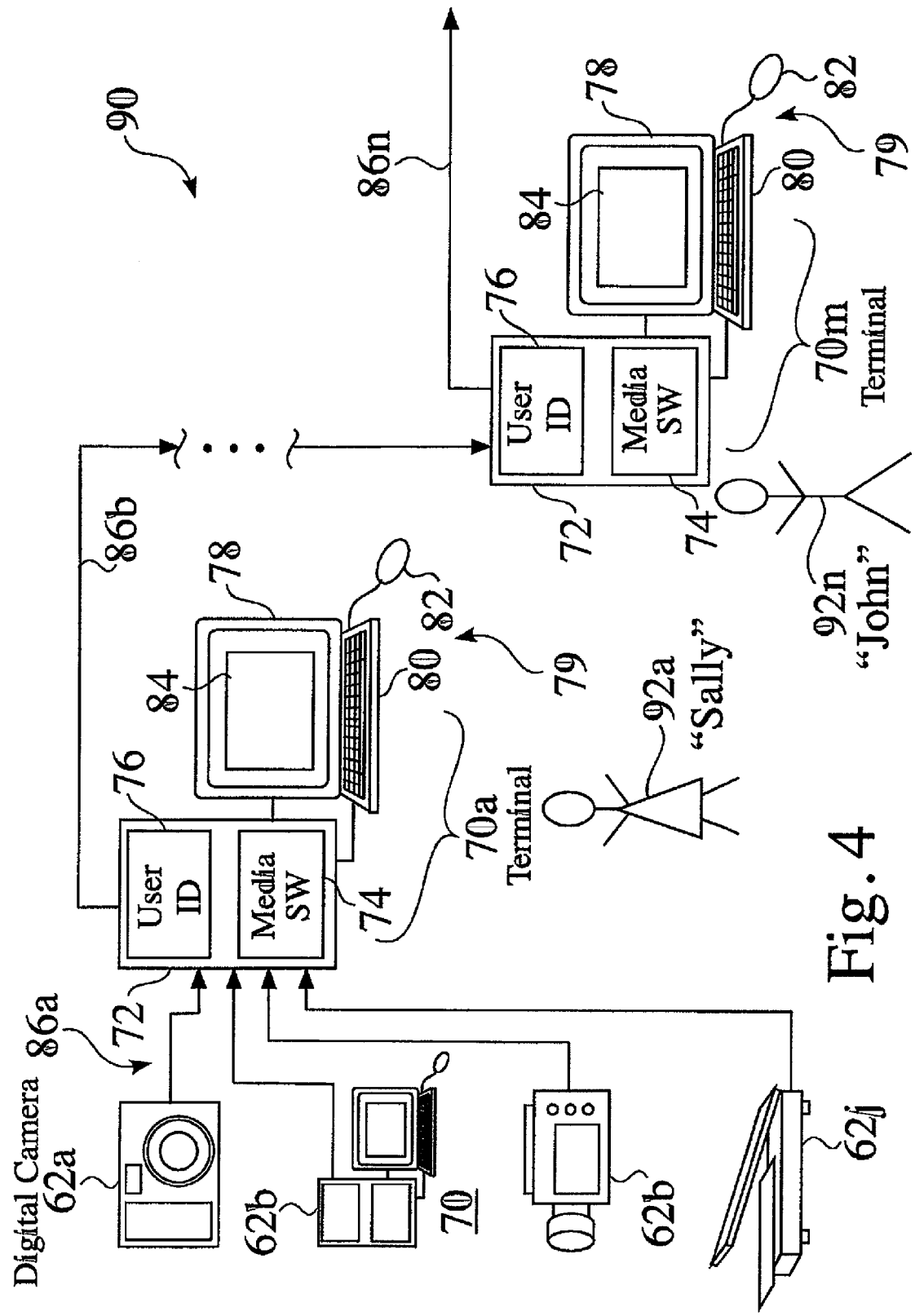
FIG. 4 is a schematic view of a variety of file content sources and sequential transmission and usage at one or more node terminals.

For example, if a first person 92a, e.g. Sally, in FIG. 4 takes a photograph asset 14 with a camera 62a, the source creator 22b may comprise the identity of the camera 62a. Similarly, the source type 22a of camera 62a shown in FIG. 4 is the identity of the camera 62a used to create the photograph 14.

The exemplary source information 18 shown in FIG. 1 comprises information regarding the subsequent use 24a-24k of the content 14, as the content 14 is distributed to one or more recipients. If the first person 92a uses or modifies the photograph asset 14, the usage 24 is noted 24a-24k within the metadata source node 18b. Similarly, if a subsequent person 92n uses or modifies the photograph asset 14, the usage 24 is noted 24a-24k within the metadata source node information 18n.

Figure 2:
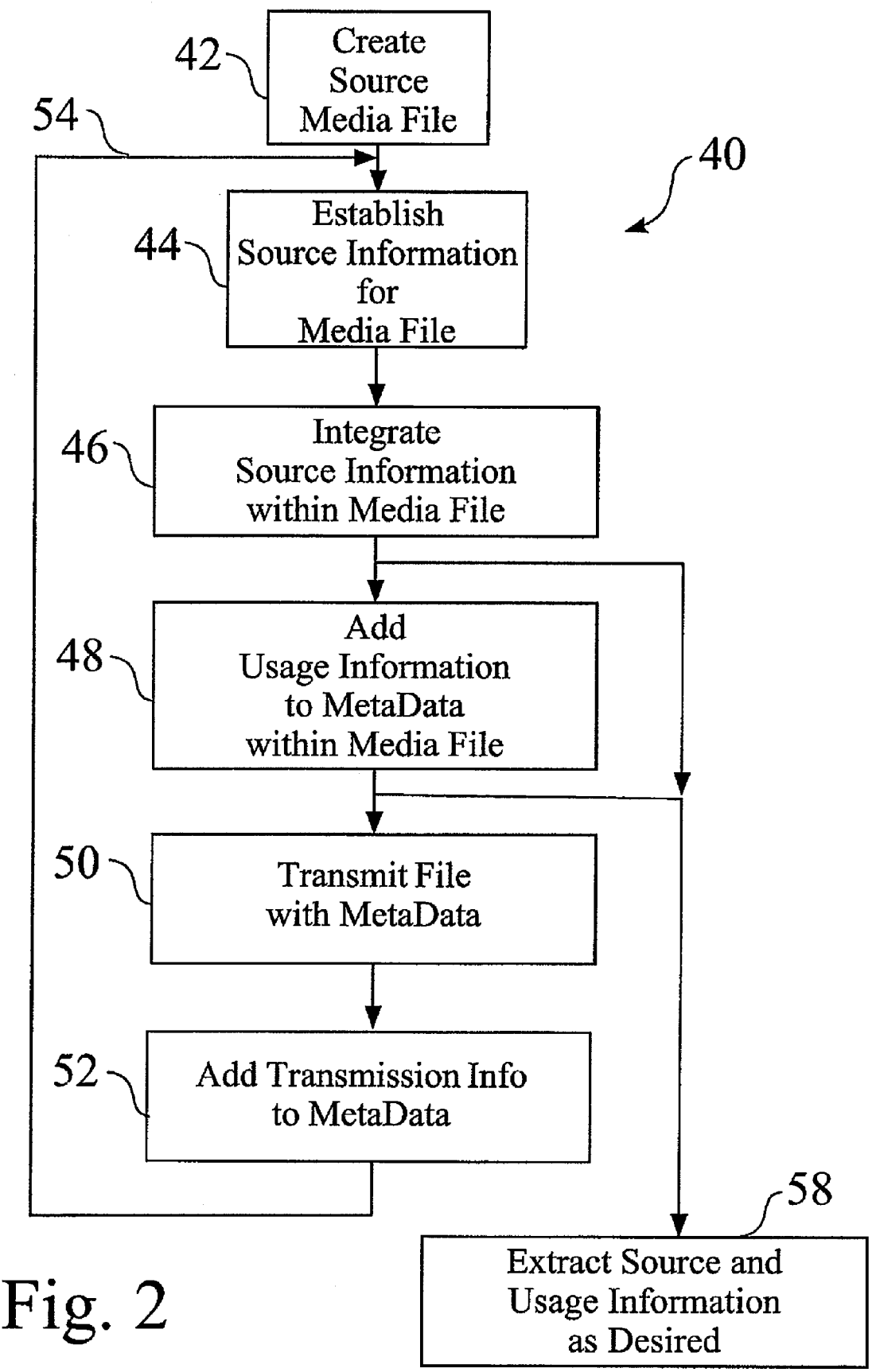
FIG. 2 is a flowchart of a process for the incorporation of enhanced metadata.

FIG. 2 is a flowchart of a process 40 for the incorporation and use of enhanced metadata 16 within an enhanced media asset 12. A media asset 14 is provided or created 42, and source information 18 is established 44 in regard to the media asset 14 at each node 18. Information regarding each source node 18 is then integrated 46 with the media asset 14, such as through encoding, whereby the source information 18a-18n is retained with the media asset 14, such as through distribution 86 (FIG. 3) and/or subsequent use 24a-24k.

Usage information 24a-24k is added 48 to the metadata 16 at any node 18a-18n where the asset is used 24. For example, usage 24 may comprise processing or modification to the asset, or may comprise other information 24 that is added at a node 18, such as a rating by a user 92 (FIG. 4).

As seen in FIG. 2, as the enhanced media asset 12 (FIG. 1) is transmitted, sent, or distributed 50 to one or more users, transmission information 26 (FIG. 1) is preferably captured and added 52 to the metadata 16, to provide details of the transfer of the enhanced media asset 12. In some enhanced media assets 12, transfer information 26 comprises a transfer date and/or time at which the enhanced media asset 12 is sent to a subsequent node 18. In alternate enhanced media assets 12, the transfer information 26 may also comprise distribution channel information, such as a log of electronic communication.

As the enhanced media asset 12 is sent and used, the source information 18a-18n, which may include usage information 24a-24k and/or transfer information 26a-26m, is added to the metadata 16 within the enhanced media asset 12, such that a usage audit trail 48 is incorporated within the asset itself. The metadata 16, comprising reiterative source 18a-18n, usage information 24, and transfer information 26, is integrated, such as through encoding, in conjunction with the media asset 14.

The source and usage information is selectively accessed 58 at one or more points during the creation 42, distribution, and subsequent use 30 of the enhanced media asset 12, in which the source information 18 and usage information 28 is extracted 58. Therefore, at any point in the distribution 50 and use 24 of a media asset 14, a user may selectively extract 58 a comprehensive audit trail of metadata 16 associated with the source nodes 18a-18n and usage 24 of the media asset 14.

As well, the exemplary source information 18 shown in FIG. 1 comprises a variety of information regarding the use and/or distribution 30, e.g. 30a-30n of the file content 14, comprising one or more uses 30a-30n, associated usage identifiers 32a-32n, and usage information 34a-34k corresponding with each use 32.

Figure 3:
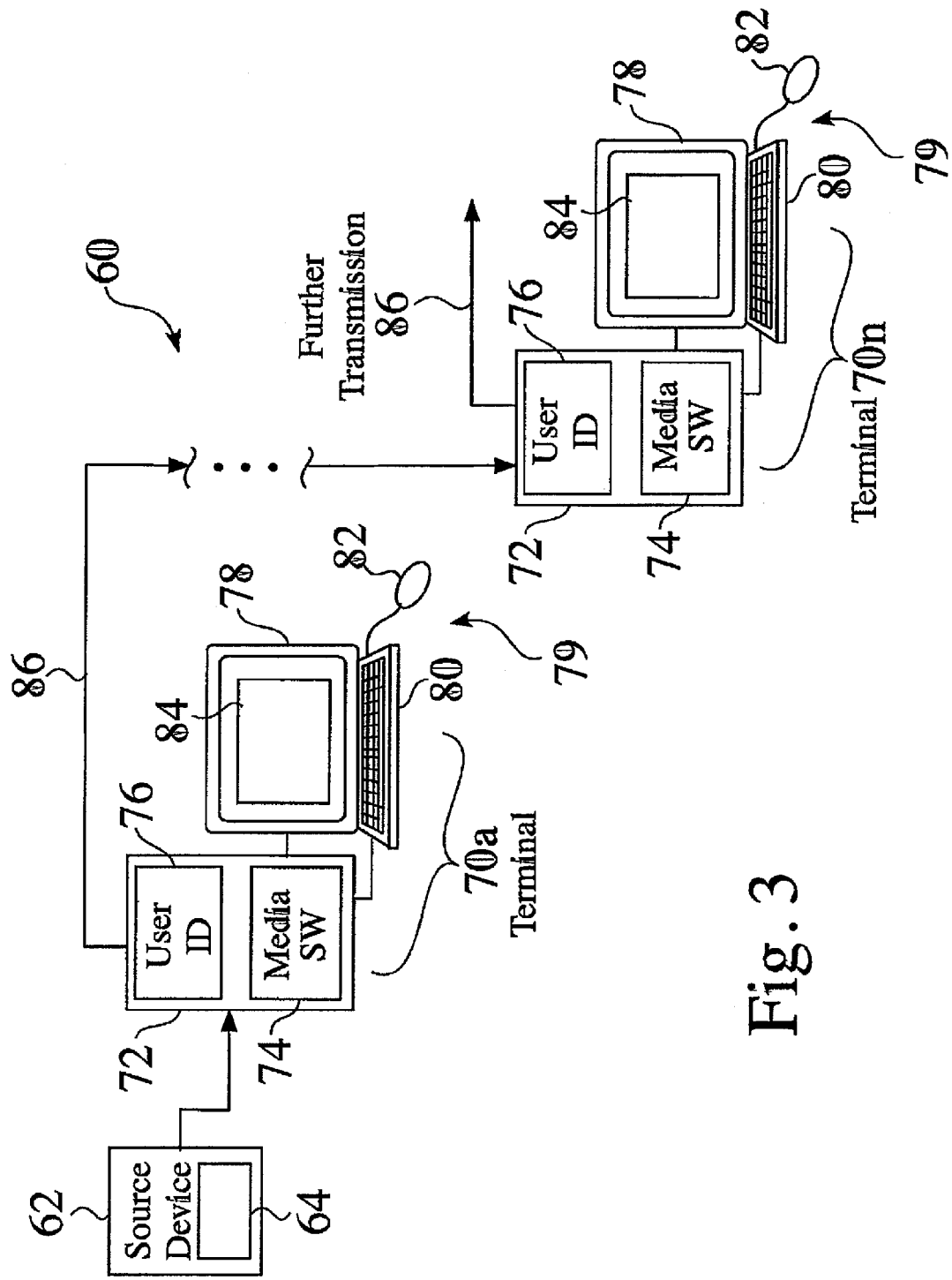
FIG. 3 shows a file content source and sequential transmission and usage.

The enhanced media asset 12 and associated process 40 (FIG. 2) takes the trail of metadata gathered about the source 18 and use 28 of the media file 12, and integrates or encodes that metadata 18,28 into the media file 12, before sending the file 12 to another computer system 70 (FIG. 3). This metadata 18,28 then accumulates as a trail of source information 18 and usage information 28 in the file itself, which can be extracted 56 (FIG. 2) upon arrival in the target computer system 40. In some system embodiments 12, the encoding of metadata 16 and attachment to media asset files 14 is provided through conventional file tagging schemes.

FIG. 3 is a sequential schematic view 60 of a file content source 62 and sequential transmission 86 and usage 84 at one or more user terminals 70, e.g. such as user terminals 70a-70n. FIG. 4 is a sequential schematic view 90 of a variety of file content sources 62a-62j and sequential transmission 86a-86n and usage 84 at one or more node terminals 70a-70n. Each terminal 70, e.g. 70a-70n, typically comprises a central processing unit (CPU) 72, a user or terminal ID 76, e.g. such as a unique IP address, a screen name, an email address, or a user identity 76. Each terminal 70 shown in FIG. 3 and FIG. 4 also typically comprises media access software 74, a display 78, and a user interface 79, typically comprising a keyboard 80 and a pointing device 84 associated with a user graphic display 84, though which a media asset 14 and/or associated metadata 16 may be accessed.

While the exemplary terminals 70, e.g. 70a-70n, shown in FIG. 3 and FIG. 4 are shown as computer terminals 70, the media asset 14 and/or associated metadata 16 may be used and accessed by a wide variety of devices, such as but not limited to portable computers, portable digital assistants, or other wired or wireless, i.e. mobile, devices 70 associated with the reception, use, presentation, and/or subsequent transmission 86 of media assets 12,14.

The source device 62 shown in FIG. 3 comprises a media asset creator 64, e.g. such as but not limited to software or hardware. For example, for a source device comprising a digital camera 62a, a digital video camera 62c, or a digital scanner 62j (FIG. 4), the media asset creator may comprise image capture and storage 64 (FIG. 3). Similarly, for a source device 62b (FIG. 4) comprising a computer 70, the media asset creator may comprise illustration software, by which a user composes or creates a source media asset 14.

FIG. 5 is a schematic view 98 which shows a variety of content or asset formats which can be integrated with enhanced metadata 16, such as an image asset 14a, a video asset 14b, a text asset 14c, a sound asset 14d, a page layout asset 14e, a pixel-based asset 14f, a vector-based content 14g, an animation asset 14h, a data asset, and/or a multimedia asset 14p.

Figure 6:
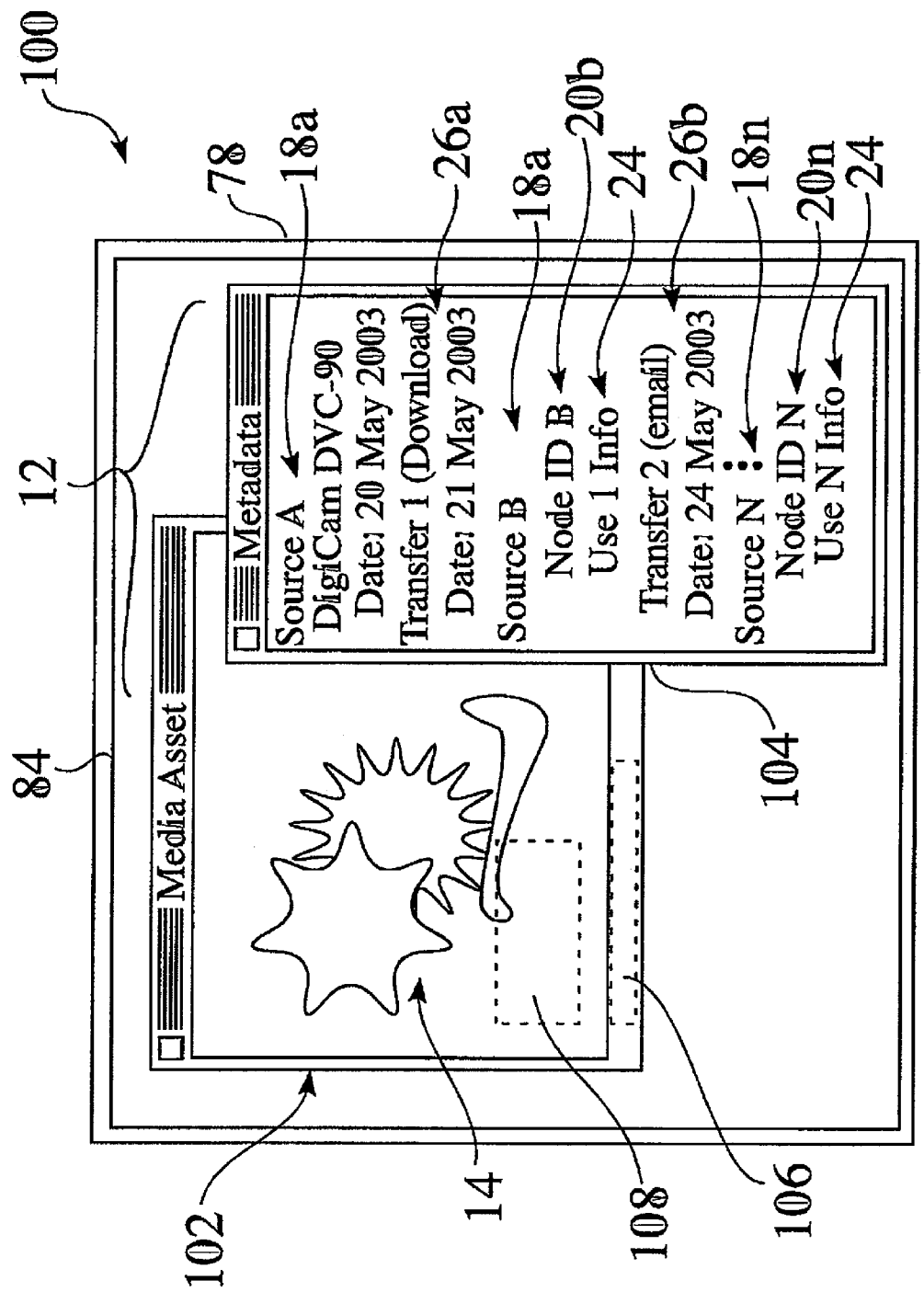
FIG. 6 is a detailed schematic view of the display of source and usage information associated with a media asset file.

FIG. 6 is a detailed schematic view of the display 100 of source and usage information associated with an enhanced media asset file 12. A media asset 14 is typically displayed or played within a media asset window 102, while source information 18 usage information 24, and/or transfer information 26 is typically selectively accessed and displayed within one or more metadata display windows 104.

The source information 18, usage information 24, and transfer information 26 is extractable 58 and/or displayable in a wide variety of formats, such as but not limited to the periphery 104 of the media asset window 106, or as an information overlay 108 appearing at any point in the displayed media asset 14.

In some system embodiments 10,40,110 (FIG. 7), the source information 18, usage information 24, and transfer information 26 is also exportable, either in context with a single enhanced media asset 12, or in context with a plurality of enhanced media assets 12, e.g. such as to view the sources, distribution, and usage of one or more media assets 12 within an electronic publication or website.

As well, the source information 18 and/or usage information 58 that is integrated or encoded within the enhanced content file 12a is preferably searchable, such that a user may readily locate or find a desired media asset 14, such as from within media software 74 (FIG. 3), or externally, such as from search or find utility software.

Figure 7:
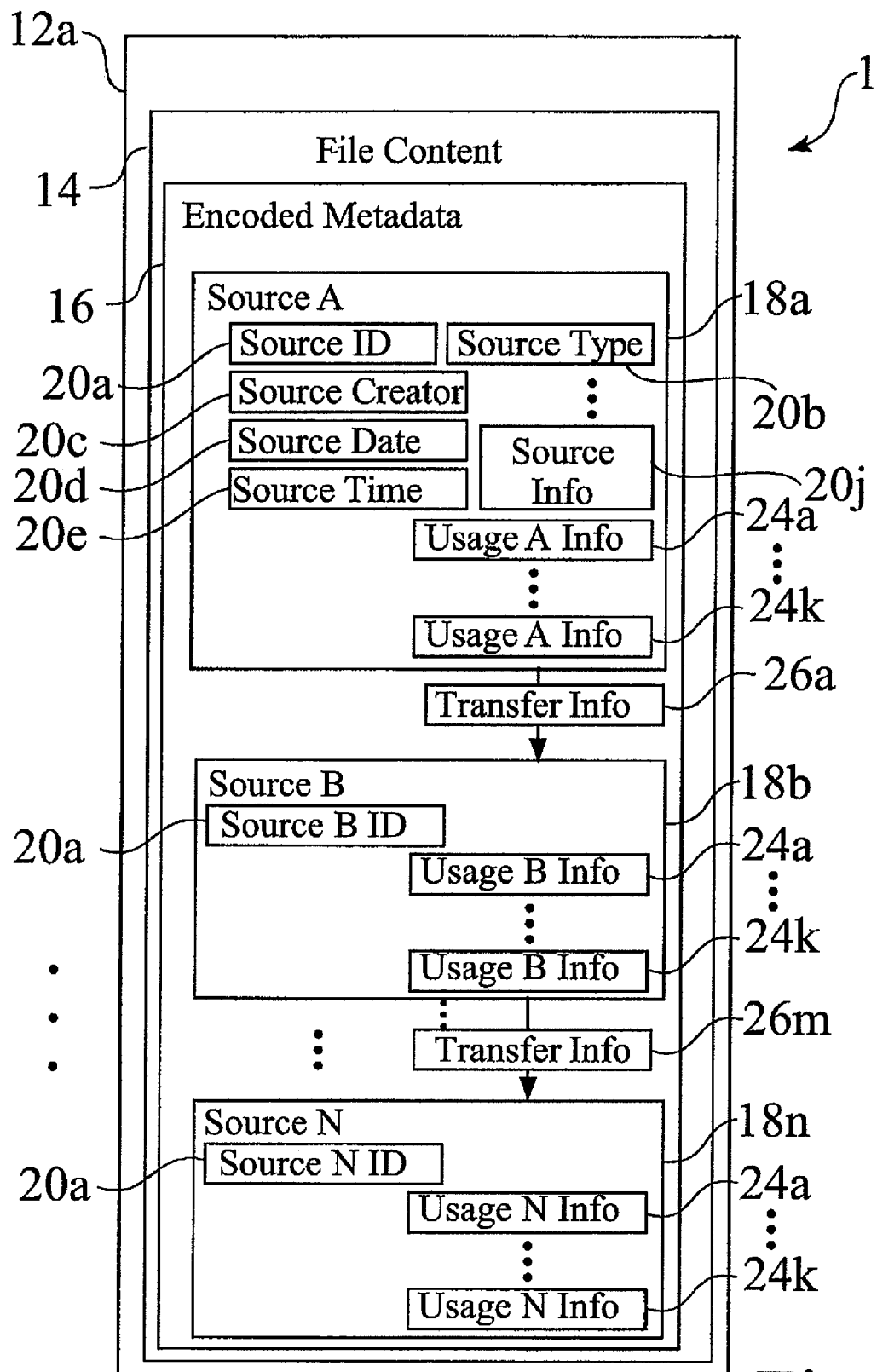
FIG. 7 is a schematic view of an alternate enhanced content file having audit trail metadata which is integrated or encoded within the media asset.

Alternate System Embodiments. FIG. 7 is a schematic view 110 of an alternate enhanced content file 12a having audit trail metadata 16 which is integrated or encoded within the media asset 14. The enhanced metadata 16 is readily integrated within the media asset itself, such that is can be extracted 58 (FIG. 2), such as selectively by any recipient of the enhanced content file 12a, or securely, such as through the use of a password.

As described above, the content file 12a may similarly comprise any media asset 14, such as but not limited to image content 14a, video content 14b, text content 14c, sound content 14d, page layout content 14e, pixel-based content 14f, vector-based content 14g, animation content 14h, data content, and/or multimedia content 14p.

The enhanced metadata 16 comprises metadata gathered about the source nodes 18a-18n and use 24a-24k of a media asset 12 and encodes that metadata 16 into the file content 14 before the enhanced media asset 12 is sent to another computer system 70 (FIG. 3). This enhanced metadata 16 then accumulates, as a trail of source information 18a-18n, transfer information 26a-26m between node sources 18a-18n, and usage information 24a-24k at each of the node sources 18a-18n. The accumulated enhanced metadata 16 is included within the enhanced file 12, and can be extracted 58 upon arrival in the target computer system 70.

The enhanced metadata structure 10,110 and associated process 90 allows the capture and storage of useful information 18,28 about where a media asset (or file) comes from, i.e. source information 18a-18n, how the media asset 12 is transferred 26a-26m, and how the media asset is used 24a-24k. The captured information 18,26,24 is incorporated, attached, and/or encoded into the media asset 18, and is retrievable at one or more destinations, such as to provide a captured audit trail of the source 18 and usage 28 of the media asset 14.

Figure 8:
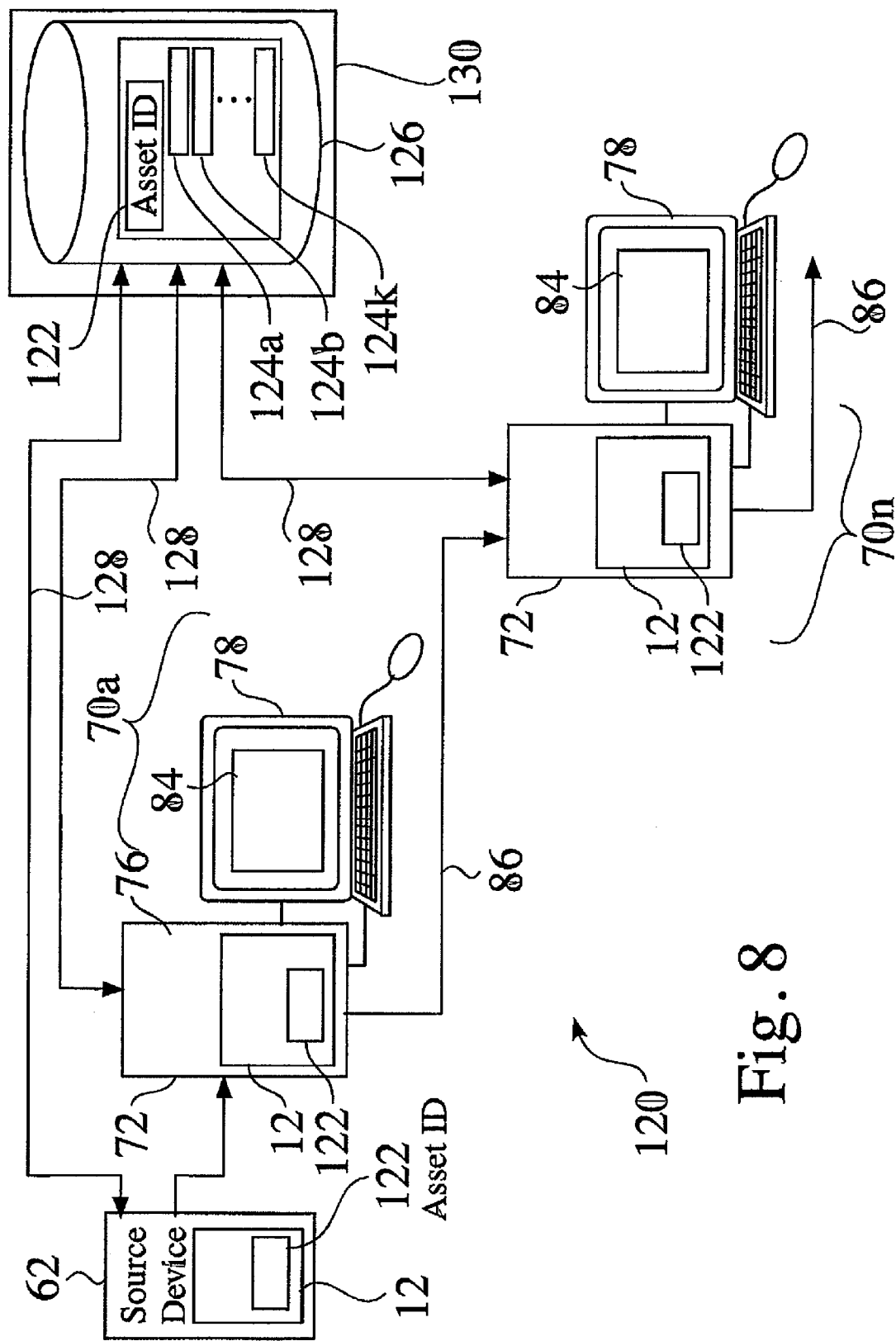
FIG. 8 is a schematic view of a combined internal and external metadata storage system.

FIG. 8 is a schematic view of a combined internal and external metadata storage system 120, comprising a file content source 62 and sequential transmission 86 to one or more user terminals 70, e.g. such as user terminals 70a-70n, in which an alternate enhanced media asset 12 preferably comprises a unique asset identifier ID 122, and in which metadata information 124a-124k is externally storable 126, such as within an external database 126. The asset ID 122 is stored in the asset 12, and can be used at any point of distribution 70, to lookup 128 additional metadata 124a-124k for the asset 12 in the external database 126.

The asset ID 122 is retained within the asset 12, such that the "identity" of the asset 12 is maintained, even if the asset 12 moves in and out of a closed system governed by the database 126. For example, as seen in FIG. 8, a unique identifier 122 is stored in an image asset 12, whereby the asset identifier 122 is used to access further information 124a-124k in a database 126, such as within a database 126 for an Internet provider 130. Even if the asset 12 is emailed or otherwise sent to another user 92 (FIG. 3) that does not have access to the database 126, e.g. a non-subscriber, of the internet service 130, the asset ID 122 continues to be retained within the asset 12. If the asset 12 is resent or forwarded to another user 92 who has access to the database 126, the retained access ID 122 metadata allows the recipient, i.e. subscriber, user 92 to access the information 124a-124k.

In some embodiments of the combined internal and external metadata storage system 120, the externally stored metadata may comprise audit trail information 18, 24, 26 for the media asset as it is sent and used, such as through one or more distribution channels. For example, a user at one terminal 70, e.g. 70a, may distribute a media asset 12 to more than one recipient node 70. The use of external storage of audit trail information provides storage and access for one or more branches of distribution and use.

As well, the externally stored metadata 124a-124k within the combined internal and o external metadata storage system 120 may comprise a wide variety of other information 124, such as but not limited to textual annotations for the image 12 provided by different users 92. Users that have access to the database 126 have access to all previous textual annotations for the asset 12, since the identity 122 of the image 12 is maintained, in the context of the database 126.

System Advantages. The enhanced metadata structures 10,110,120 and associated process 40 provide a significant value to the creator and subsequent users of a media asset 14. Through the implementation of the enhanced metadata structures 10,110,120 and associated process 40, a recipient of a media asset 14 also receives and has access to a comprehensive trail of source information 18 and usage 24 of a media asset 14.

While some software applications include basic user definable metadata, such as a creation date and/or a last modification date, the enhanced metadata structure 10,110 and associated process 90 captures and stores source information 18 and usage information 24 within the asset 14, which provides an automated audit trail, which may further include transfer information 26 that can be selectively extracted 58 at any point of distribution.

The enhanced metadata structure 10,110 and associated process 90 readily accumulates a trail of source information 18 and usage information 26 within the enhanced file 12, which is then extractable and/or searchable upon arrival in a target computer system 70.

Although the enhanced metadata structure and methods of use are described herein in connection with personal computers, mobile devices, and other microprocessor-based devices, such as portable digital assistants or network enabled cell phones, the apparatus and techniques can be implemented for a wide variety of electronic devices and systems, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A process for integrating source information into a media asset, comprising the steps of:
   providing a media asset at a first source node of a plurality of nodes, each of the plurality of nodes having a respective user associated therewith;
   sequentially transferring the media asset from the first source node to at least one recipient node of the plurality of nodes;
   cumulatively integrating audit trail information within the media asset at the source node and at each of the recipient nodes that act as subsequent source nodes to transfer the media asset to a subsequent recipient node, the audit trail information comprising source information and transfer information, wherein the source information comprises information regarding each of the respective source nodes; and wherein the transfer information comprises any of a transfer date, a transfer time, or a transfer type associated with the transfer of the media asset.

2. The process of claim 1, wherein the source information further comprises identification information associated with each of the respective users.

3. The process of claim 1, further comprising the step of:
   extracting the cumulatively integrated audit trail information at any of the nodes.

4. The process of claim 3, wherein the extraction step comprises any of selective extraction by a recipient user, or secure extraction with a password.

5. The process of claim 1, wherein the audit trail information is encoded within the media asset.

6. The process of claim 1, wherein at least one of the nodes comprises any of a terminal, a computer, a portable computer, a portable digital assistant, a wired device and a wireless device.

7. The process of claim 1, wherein the media asset is provided by a source device.

8. The process of claim 7, wherein the source information comprises any of manufacturer information, model information, or a globally unique identifier for the source device.

9. The process of claim 7, wherein the source device comprises any of a computer, a digital camera, a digital video camera, and a digital scanner.

10. The process of claim 1, wherein the media asset comprises any of image content, video content, text content, sound content, page layout content, pixel-based content, vector-based content, animation content, data content and multimedia content.

11. A process for integrating source information into a media asset, comprising the steps of:
providing a media asset at a first source node of a plurality of nodes, each of the plurality of nodes having a respective user associated therewith;
controllably distributing the media asset by the user at the first source node to at least one recipient node of the plurality of nodes;
cumulatively integrating source information and transfer information within the media asset at the source node and at each of the recipient nodes when corresponding users distribute the media asset to a subsequent recipient node, wherein the source information comprises information regarding each of the respective source nodes, and wherein the transfer information comprises any of a transfer date, a transfer time, and a transfer type associated with the distribution of the media asset.

12. The process of claim 11, wherein the source information further comprises identification information associated with each of the respective users.

13. The process of claim 12, wherein the identification information associated with each of the respective users comprises any of a name, an e-mail address, or a screenname.

14. The process of claim 11, further comprising the step of:
extracting the cumulatively integrated audit trail information at any of the nodes.

15. The process of claim 14, wherein the extraction step comprises any of selective extraction by a recipient user, or secure extraction with a password.

16. The process of claim 11, wherein the audit trail information is encoded within the media asset.

17. The process of claim 11, wherein at least one of the nodes comprises any of a terminal, a computer, a portable computer, a portable digital assistant, a wired device and a wireless device.

18. The process of claim 11, wherein the media asset is provided by a source device.

19. The process of claim 18, wherein the source information comprises any of manufacturer information, model information, or a globally unique identifier for the source device.

20. The process of claim 18, wherein the source device comprises any of a computer, a digital camera, a digital video camera, and a digital scanner.

21. The process of claim 11, wherein the media asset comprises any of image content, video content, text content, sound content, page layout content, pixel-based content, vector-based content, animation content, data content and multimedia content.

22. A system, comprising:
a plurality of nodes, each of the nodes comprising a processor associated therewith for processing a media asset, each of the plurality of nodes having a respective user associated therewith; and
means for sequentially transferring a media asset from a first source node of the plurality of nodes to at least one recipient node of the plurality of nodes;
wherein the processors are programmed to cumulatively integrate audit trail information within the media asset at the source node and at each of the recipient nodes that act as subsequent source nodes to transfer the media asset to a subsequent recipient node, the audit trail information comprising source information and transfer information, wherein the source information comprises information regarding each of the respective source nodes; and wherein the transfer information comprises any of a transfer date, a transfer time, or a transfer type associated with the transfer of the media asset.

23. The system of claim 22, wherein the cumulatively integrated audit trail information is extractable at any of the recipient nodes.

24. The system of claim 23, wherein the extractable information is performable by any of selective extraction by a recipient user, or secure extraction with a password.

25. The system of claim 22, wherein the audit trail information is encoded within the media asset.

* * * * *